United States Patent
Seward et al.

(10) Patent No.: US 10,731,827 B2
(45) Date of Patent: *Aug. 4, 2020

(54) BAY LUMINAIRE WITH YOKE ASSEMBLY

(71) Applicant: Hubbell Incorporated, Shelton, CT (US)

(72) Inventors: Alan Seward, Simpsonville, SC (US); Dustin Parsons, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,522

(22) Filed: Sep. 24, 2019

(65) Prior Publication Data

US 2020/0018462 A1 Jan. 16, 2020

Related U.S. Application Data

(63) Continuation of application No. 15/495,018, filed on Apr. 24, 2017, now Pat. No. 10,422,512.

(60) Provisional application No. 62/326,189, filed on Apr. 22, 2016.

(51) Int. Cl.
| | | |
|---|---|---|
| *F21V 17/00* | (2006.01) | |
| *F21V 29/503* | (2015.01) | |
| *F21V 21/08* | (2006.01) | |
| *F21V 29/74* | (2015.01) | |
| *F21Y 115/10* | (2016.01) | |
| *F21V 23/02* | (2006.01) | |
| *F21V 23/04* | (2006.01) | |
| *F21W 131/40* | (2006.01) | |
| *F21W 131/402* | (2006.01) | |

(52) U.S. Cl.
CPC ............ *F21V 17/002* (2013.01); *F21V 21/08* (2013.01); *F21V 21/0832* (2013.01); *F21V 23/023* (2013.01); *F21V 23/0464* (2013.01); *F21V 23/0471* (2013.01); *F21V 29/74* (2015.01); *F21W 2131/40* (2013.01); *F21W 2131/402* (2013.01); *F21Y 2115/10* (2016.08)

(58) Field of Classification Search
CPC ..... F21V 17/002; F21V 29/503; F21V 29/505
See application file for complete search history.

(56) References Cited

U.S. PATENT DOCUMENTS

| | | |
|---|---|---|
| 5,003,430 A | 3/1991 | Vonarx et al. |
| 10,422,512 B2 * | 9/2019 | Seward .................... F21V 21/08 |
| 2009/0103294 A1 | 4/2009 | Zhang et al. |
| 2011/0284730 A1 | 11/2011 | Sturdevant |
| 2013/0265764 A1 | 10/2013 | Holman |
| 2014/0056017 A1 | 2/2014 | Carloni et al. |
| 2014/0199168 A1 | 7/2014 | Spiro |

(Continued)

OTHER PUBLICATIONS

PCT/US2017/029088 International Search Report and Written Opinion dated Aug. 29, 2017.

*Primary Examiner* — Karabi Guharay

(74) *Attorney, Agent, or Firm* — Michael Best & Friedrich, LLP

(57) ABSTRACT

A high bay luminaire includes a heat sink having a substantially disc-shaped configuration. A light emitter is connected to the heat sink. A reflector is connected to the heat sink. A yoke is connected to the heat sink. The yoke has a first arm, a second arm, and a top bar. A driver is connected to the yoke so that the driver extends between the first arm and the second arm.

20 Claims, 7 Drawing Sheets

(56) References Cited

U.S. PATENT DOCUMENTS

2015/0192274 A1 7/2015 Kubis et al.
2015/0198310 A1 7/2015 Scarlata
2015/0204533 A1* 7/2015 Rosen .................. F21V 29/006
362/294
2015/0316230 A1 11/2015 Harbers et al.

* cited by examiner

BAY LUMINAIRE WITH YOKE ASSEMBLY

RELATED APPLICATION(S)

This application is a continuation of U.S. application Ser. No. 15/495,018, filed Apr. 24, 2017, now U.S. Pat. No. 10,422,512, which is based on U.S. provisional application Ser. No. 62/326,189, filed Apr. 22, 2017, the disclosure of which is incorporated herein by reference in its entirety and to which priority is claimed.

FIELD

Various exemplary embodiments relate to light fixtures or luminaires, for example indoor luminaires.

BACKGROUND

Light fixtures, or luminaires, are used with electric light sources to provide an aesthetic and functional housing in both interior and exterior lighting applications. For example, high bay luminaires can be used in larger open indoor environments such as heavy industrial settings, warehouses, gyms, churches, and shopping malls. Conventional high bay lighting fixtures for commercial and industrial applications are often mounted or suspended from ceiling joists high above the floor.

Recently, lighting fixtures have begun using light emitting diodes (LEDs) as a light source. The use of LEDs comes with unique light distribution and thermal management requirements for both the light emitters and the control components required to run the light fixtures. These considerations can lead to complex housing and heat dissipation designs in an attempt to balance performance and aesthetic characteristics.

SUMMARY

According to an exemplary embodiment, a high bay luminaire includes a heat sink having a substantially disc-shaped configuration. A light emitter is connected to the heat sink. A reflector is connected to the heat sink. A yoke is connected to the heat sink. The yoke has a first arm, a second arm, and a top bar. A driver is connected to the yoke so that the driver extends between the first arm and the second arm.

According to another exemplary embodiment, a high bay luminaire includes a heat sink having a body, a plurality of heat fins, and an outer edge. A light emitter is connected to the heat sink. A reflector is connected to the heat sink. A yoke is connected to the heat sink. The yoke has a first arm, a second arm, a top bar, a first bracket extending from the first arm, and a second bracket extending from the second arm. The first bracket and the second bracket at least partially define an open space therebetween. A driver connected to the first bracket and the second bracket to extend across the open space, wherein the portion of the driver extending across the open space is exposed to the ambient environment.

According to another exemplary embodiment, a high bay luminaire includes a heat sink having a body, a plurality of heat fins, and an outer edge. A light emitter is connected to the heat sink. A reflector is connected to the heat sink. A yoke has a first arm connected to the heat sink, a second arm connected to the heat sink, a top bar, and a door pivotally connected to the first arm and the second arm. A driver is connected to the yoke.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
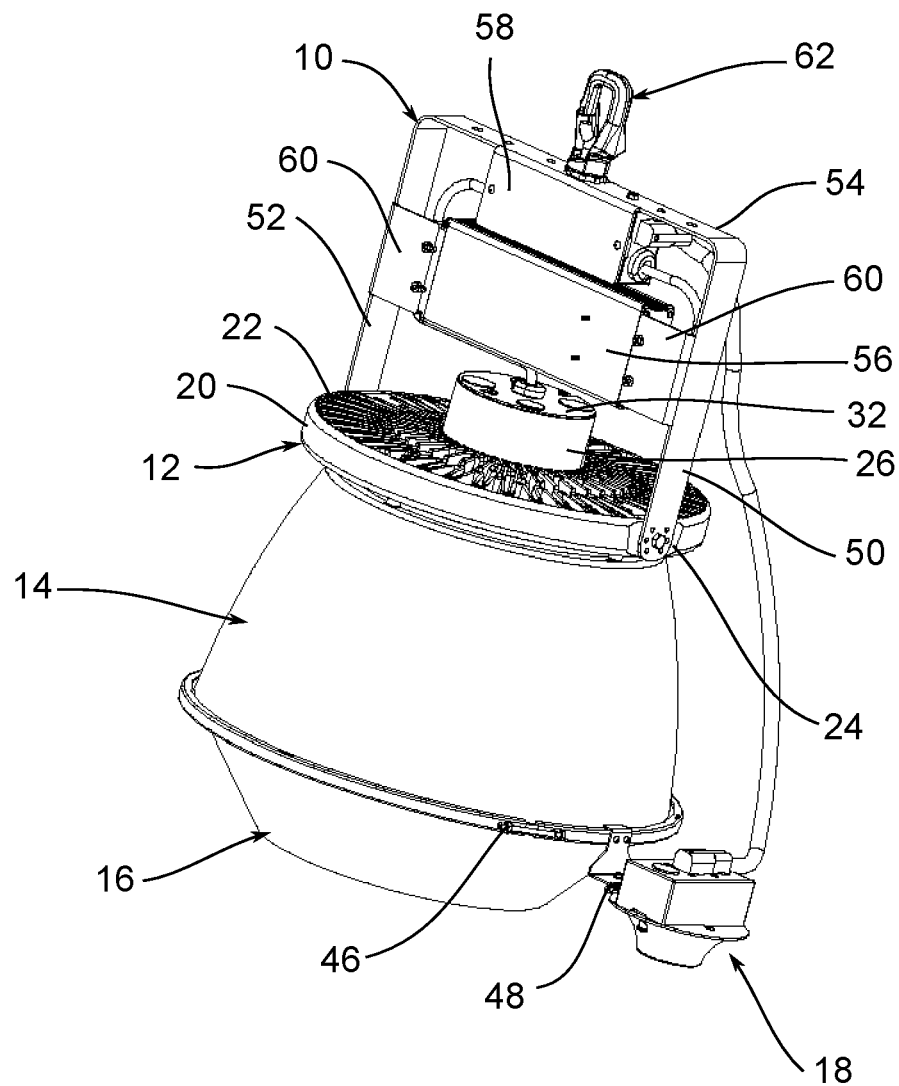
FIG. 1 is a front perspective view of an exemplary luminaire.

In an exemplary embodiment, a high bay luminaire includes a yoke assembly 10, one or more control components, a heat sink 12, a reflector 14, a lens 16, and a sensor 18. One or more light emitters are connected to the heat sink 12. The type of reflector 14 and lens 16 can be changed or removed entirely to provide a desired light output as would be understood by one of ordinary skill in the art.

Figure 2:
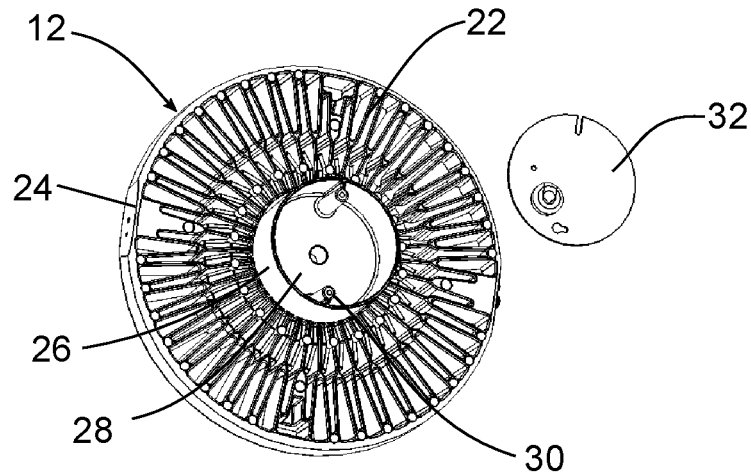
FIG. 2 is a top perspective view of the heat sink of FIG. 1.

As shown in FIG. 2, the heat sink 12 has a base with a substantially disc-shaped configuration and a substantially circular outer portion 20. A plurality of heat fins 22 extend from the outer portion 20 to an inner portion of the heat sink 12. The heat fins 22 have a substantially Y-shape configuration with a base portion positioned towards the interior of the heat skink 12 splitting into two tines which diverge as they extend toward the outer portion 20. Different sizes, shapes, and configurations of heat fins 22 can also be used depending on the desired thermal characteristics. One or more outer mounting portions 24 are provided on the outer edge to receive components associated with the luminaire, for example the yoke assembly 10. In this exemplary embodiment. The size, shape, and configuration of the heat sink 12 can be modified for different applications.

A cylindrical wall 26 extends from an upper portion of the heat sink 12 to define a recessed area 28. The recessed area 28 can act as a junction housing to make an electrical connection between the light emitter and one or more control components. One or more bosses 30 are positioned in the recessed area 28. A plate 30 having a diameter substantially equal with the outer edge of the cylindrical wall 26 can be connected over the recessed area 28 using fasteners that extend into the bosses 30.

Figure 3:
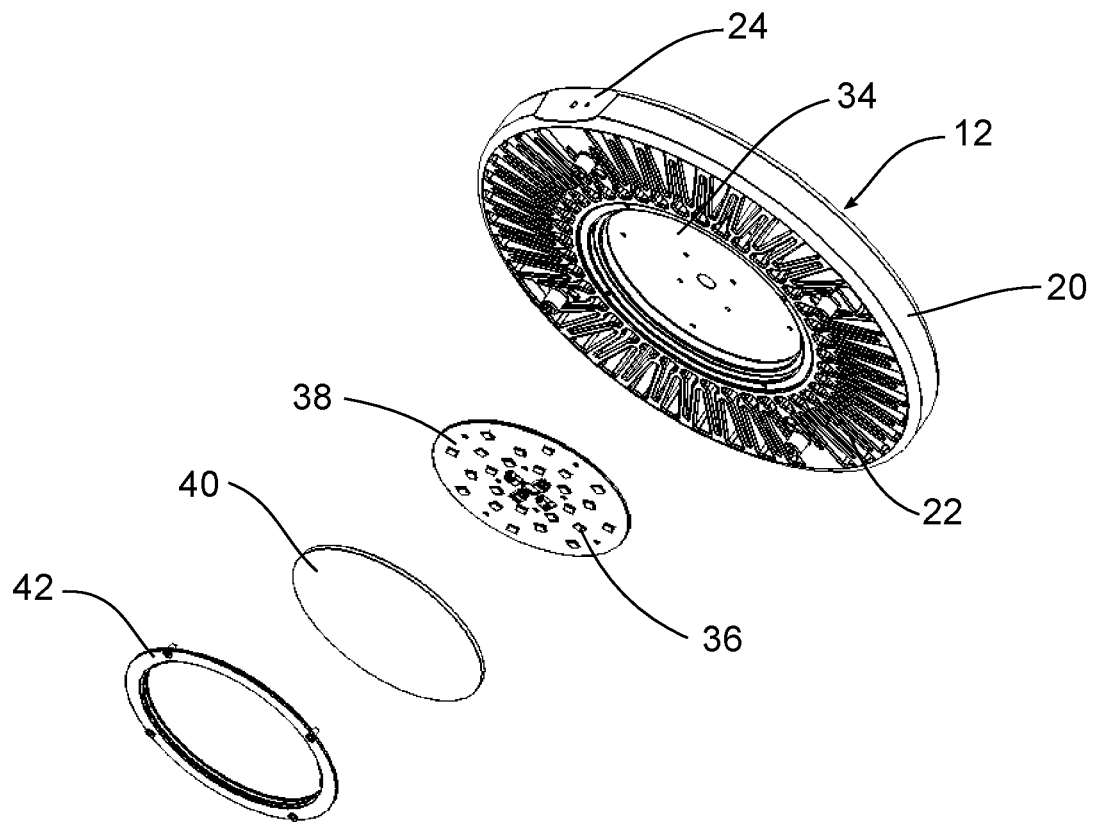
FIG. 3 is a bottom view of the heat sink and light emitter of FIG. 1.

As shown in FIG. 3, the bottom of the heat sink 12 includes a lower recessed portion 34 for receiving a light emitter. In an exemplary embodiment, the light emitter includes a plurality of LEDs 36 connected to a PCB 38. A backing (not shown) can be placed between the light emitter 16 and the heat sink 12. The backing can be made from different materials to provide insulation or increased heat transfers depending on the needed thermal characteristics.

The light emitter 16 can be connected by one or more fasteners extending into the lower recessed portion 34. A lens 40 can also be connected to the heat sink 12 over the light emitter. A mounting ring 42 is connected to the heat sink 12 to hold the lens 40 in place. A gasket can be positioned between the mounting ring 42 and the heat sink 12 and the lower recessed portion 34 can include a number of stepped rims to define different widths for receiving the light emitter PCB 38, the lens 40, and the mounting ring 42.

Figure 4:
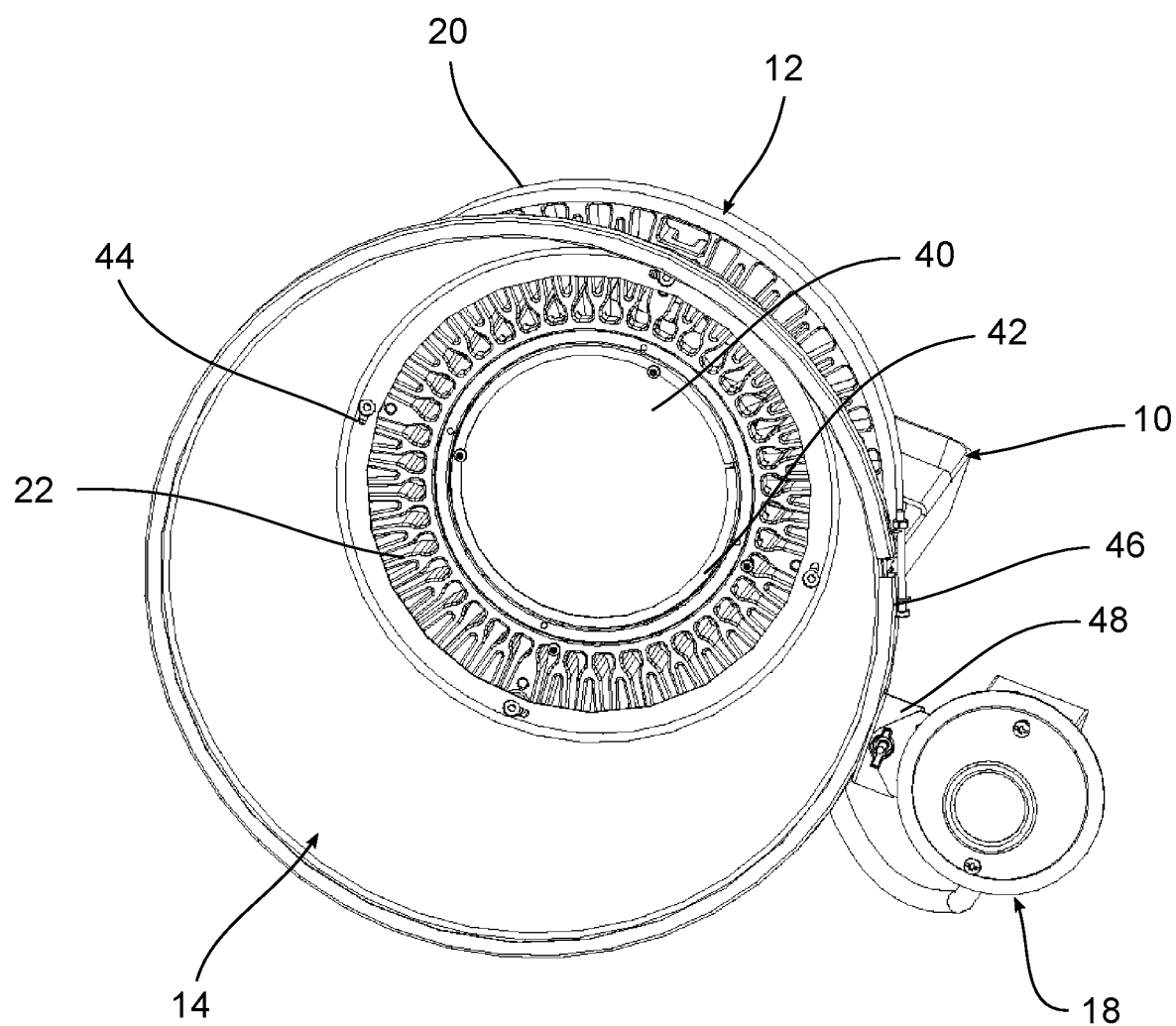
FIG. 4 is a bottom perspective view of the luminaire of FIG. 1.

As best shown in FIG. 4, the reflector 14 is removably connected to the heat sink 12 by one or more fasteners. Keyhole slots 44 can be provided in the reflector 14 to allow for quick removal and attachment without a tool. The sensor 18 is connected to the reflector 14 through a hose-clamp style connector 46 that goes around the reflector 14 and has a bracket 48 that connects to the sensor. Different types of sensors 18 can be used, including occupancy, motion, daylight, and combination sensors. A cable operatively connects the sensor 18 with the control components.

Figure 5:
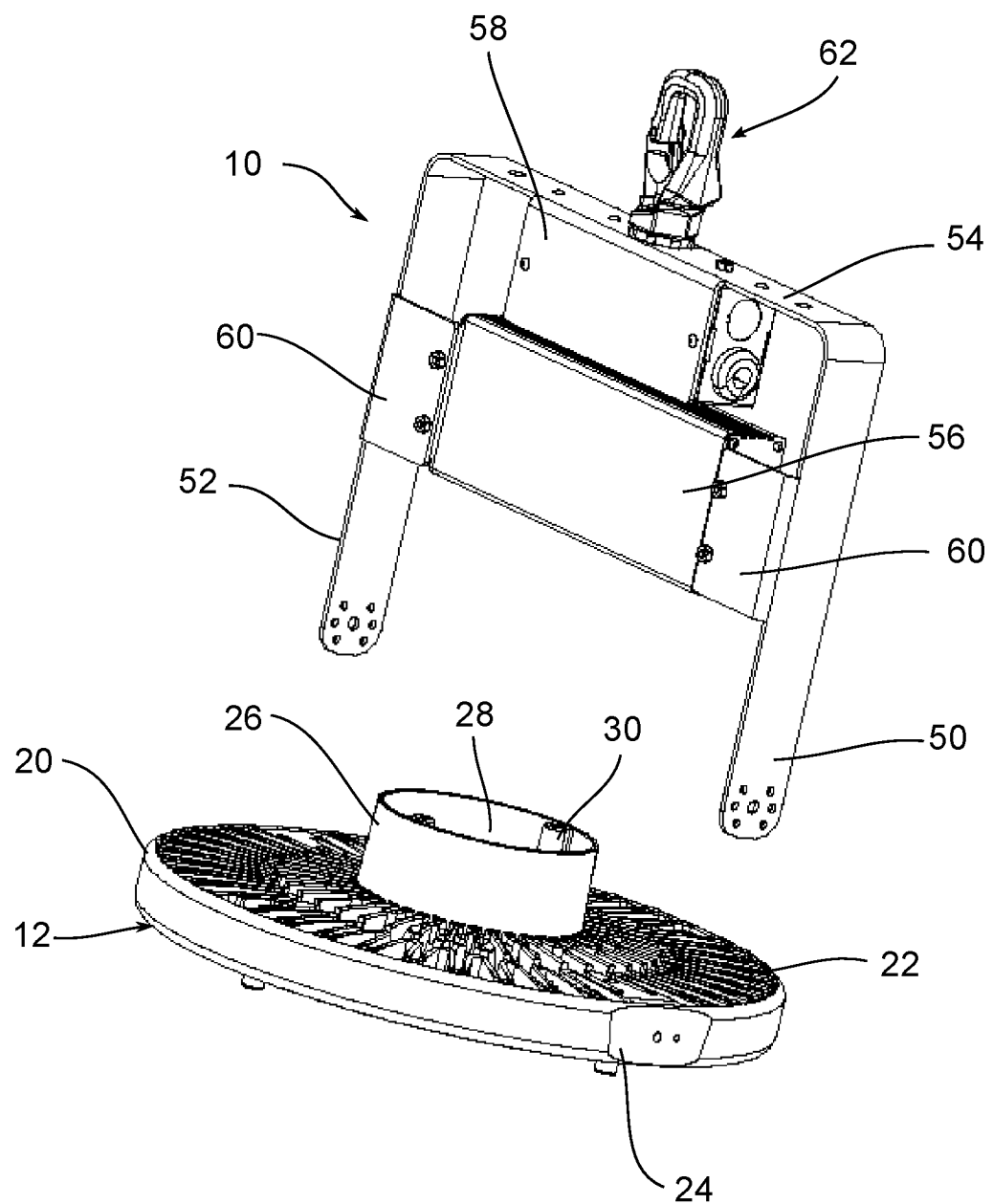
FIG. 5 is a partially exploded view of the heat sink and yoke assembly of FIG. 1.

According to an exemplary embodiment, the yoke assembly 10 includes a first arm 52, a second arm 52, and a top bar 54 as best shown in FIG. 5. The yoke is substantially open to the surrounding environment to increase heat transfer, for example there is no other housing positioned around the yoke assembly 10. The first and second arms 50, 52 are received in the first and second outer mounting portions 24. A driver 56 is connected to the first and second arms 50, 52 and a junction box 58 is connected to the top bar 54. The driver 56 can extend between the first and second arms 50, 52 and be connected by a pair of brackets 60. A power supply line can be run into the junction box 58 and a connection made to one or more conductors that extend to the driver 56. The junction box 58 can include a removable cover to provide access to a user. On or more conductors extend from the junction box 58 to the driver 56 and from the driver 56 to the recessed portion 28 of the heat sink 12 and the sensor 18 as shown in FIG. 1. The top bar 54 includes a threaded aperture for receive a hook or a pendant mount. FIG. 5 shows a hook mount 62 that includes a body with a C-shaped portion and a gate biased into a closed position.

FIGS. 6-9 show another exemplary embodiment of a high bay luminaire having a yoke assembly 110, a heat sink 112, a reflector 114, and a lens 116. The luminaire also includes one or more control components, for example a sensor 118, a relay module 120, and one or more control components positioned inside of the yoke assembly 110. The heat sink is substantially similar to the one shown in FIGS. 1-5 and includes a similar light emitter connected thereto.

The type of reflector 114 and lens 116 can be changed or removed entirely to provide a desired light output as would be understood by one of ordinary skill in the art. The reflector 114 is removably connected to the heat sink 112 by one or more fasteners. Mounting posts 124 can extend from the bottom of the heat sink 112 and receive fasteners that connect the reflector. The sensor 118 is connected to the reflector 114 through a hose-clamp style connector 126 that goes around the reflector 114 and has a bracket 128 that connects to the sensor 118.

Different types of sensors 118 can be used, including occupancy, motion, daylight, and combination sensors. A cable operatively connects the sensor 118 with one or more different control components. In an exemplary embodiment, the relay module 120 is connected to the yoke assembly 110. The first arm 130 can include an opening for connecting the relay module 120. A threaded member can connect to the relay module 120 and the first arm 130. The relay module 120 can be a radio frequency device that can control loads based on an input, for example from the occupancy sensor 118.

Figure 7:
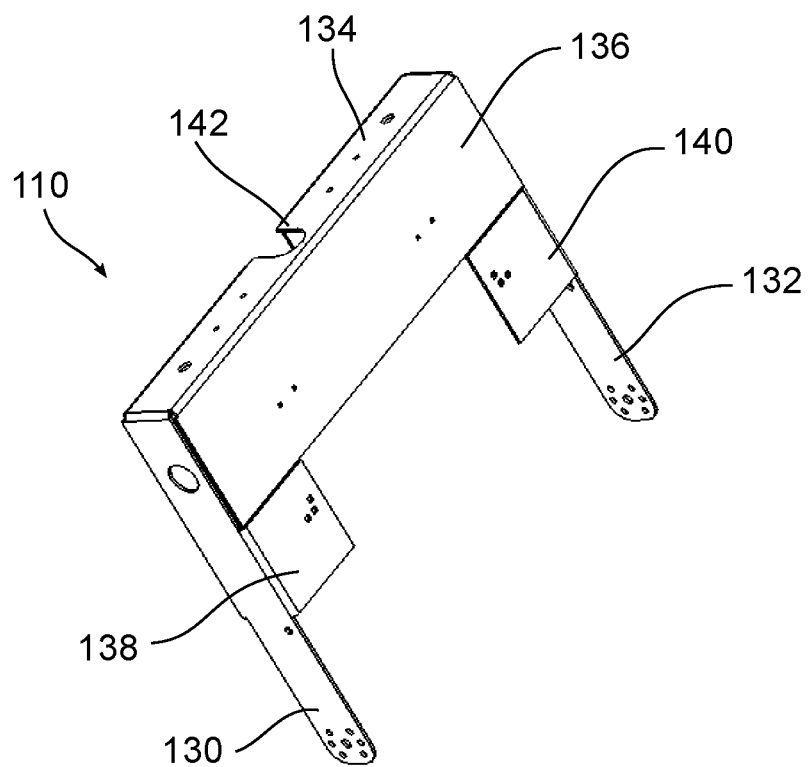
FIG. 7 is a rear perspective view of a portion of the yoke assembly of FIG. 6.
Figure 8:
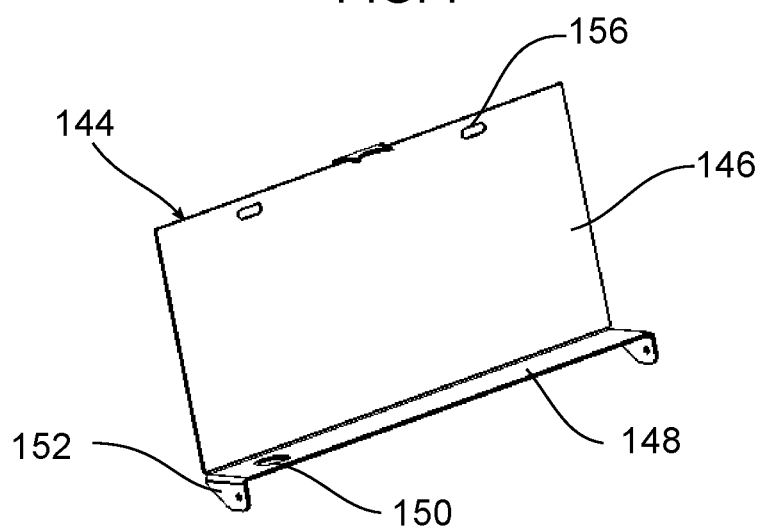
FIG. 8 is a rear perspective view of the door of the yoke assembly of FIG. 6.

According to an exemplary embodiment, the yoke assembly 110 includes a first arm 130, a second arm 132, and a top bar 134 as best shown in FIG. 7. A rear support 136 extends between the first and second arms 130, 132 for receiving one or more control components. A first mounting bracket 138 extends from the first arm 130 and a second mounting bracket 140 extends from the second arm 132. The first and second mounting brackets 138, 140 are separated from one another by an open space. The top bar 134 can include a slot 142 for receiving a mounting assembly.

Figure 6:
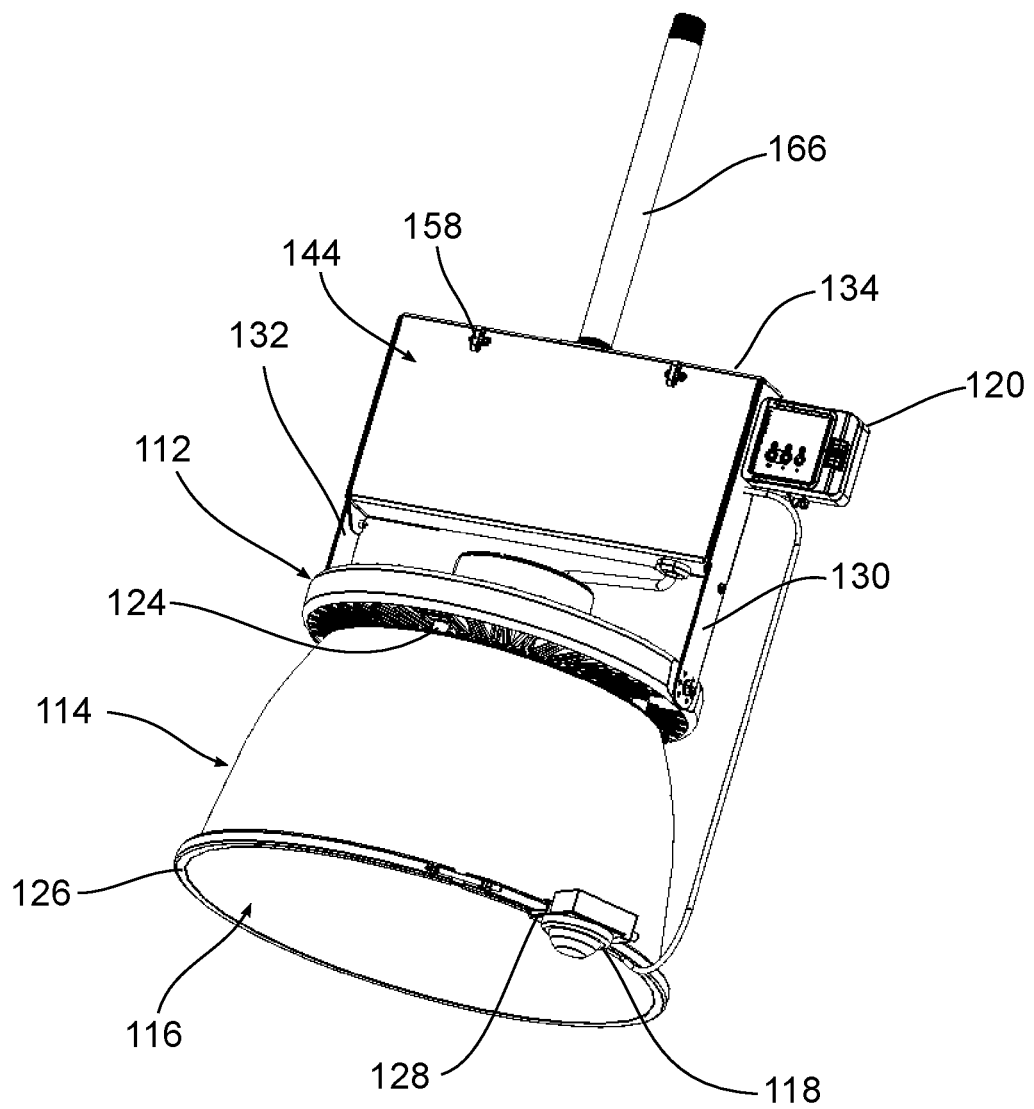
FIG. 6 is a front perspective view of another exemplary luminaire.
Figure 9:
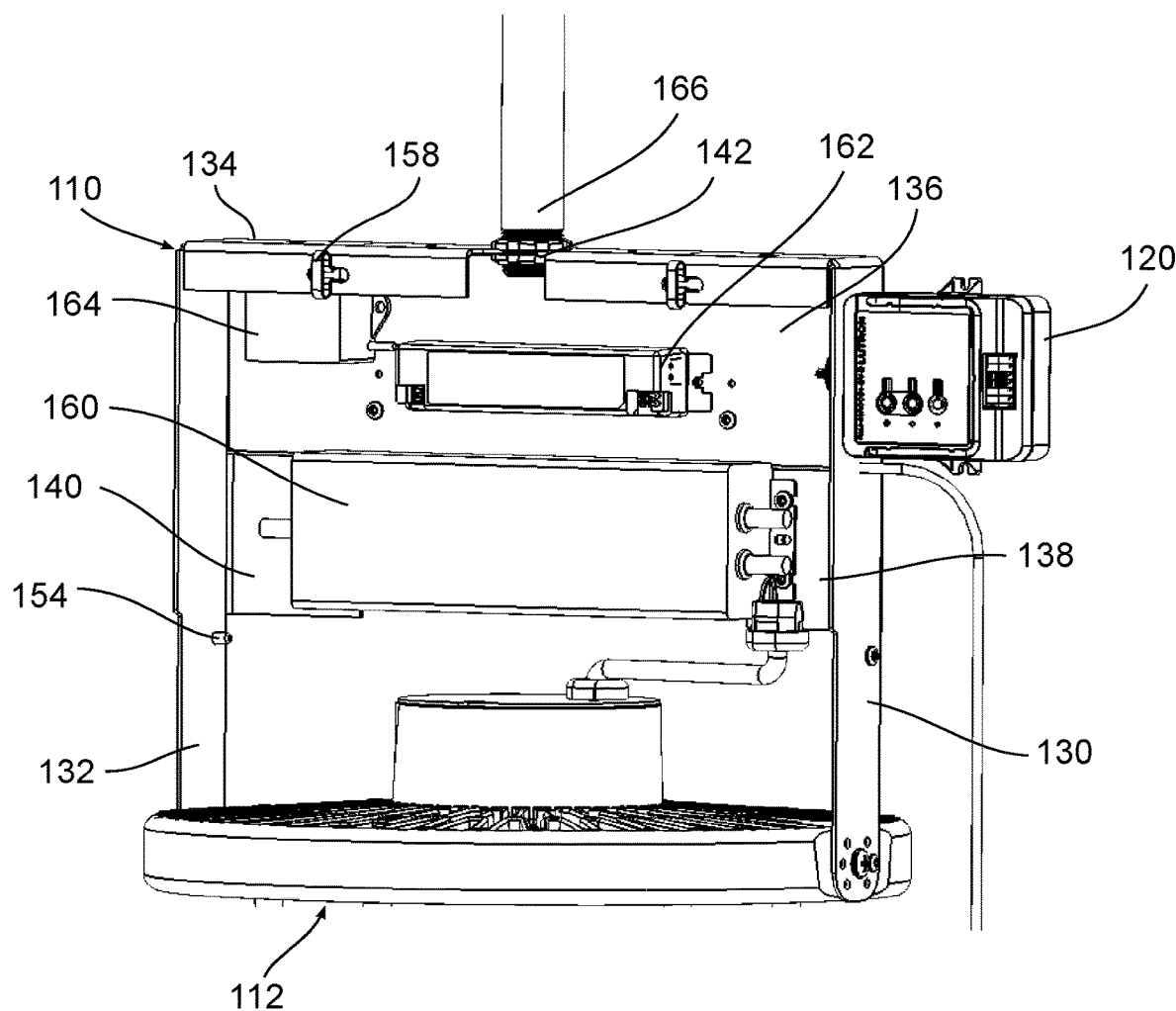
FIG. 9 is a partial view of the luminaire of FIG. 6 with the door of the yoke assembly removed.

According to some embodiments, the yoke assembly 110 also includes a door 144. FIG. 9 shows an exemplary embodiment of the door 144 that can be rotatably connected to the first arm 130 and the second arm 132. The door 144 includes a front wall 146 and a bottom portion 148. The bottom portion 148 includes an opening 150 that acts as a conductor conduit and a pair of hinge members 152. The hinge members 152 include tabs that rotatably connect to the mounting arms 130, 132. The hinge connection can include openings on the hinge members 152 and pins 154 extending from the mounting arms 130, 132, although these features can be reversed and other rotatable connections can be used. A pair of openings 156 are provided in the front wall 146 that can receive a fastener, for example the spring clips 158 as shown in FIG. 6.

FIG. 9 shows an exemplary control component assembly connected to the yoke assembly 110. A driver 160 is connected to the first and second mounting brackets 138, 140 and extends across the open space. Different types and sizes of drivers can be connected and extend across the open space so at least a portion of the driver is open to the environment to increase heat transfer. A control unit 162 and a surge protector 164 are connected to the rear support 136. The control unit 162 can be operatively connected to the driver 160 to control the amount of power provided to the light emitter, for example based on input from the sensor 118 and/or the relay 130. A pendant mount 166 is connected to the slot 142 in the top bar 134 of the yoke assembly 110.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A high bay luminaire comprising:
a heat sink having a substantially disc-shaped configuration;
a light emitter connected to the heat sink;
a yoke connected to the heat sink and having a first arm, a second arm, and a door pivotally connected to the first arm and the second arm; and
a driver connected to the yoke so that the driver extends at least partially between the first arm and the second arm.

2. The luminaire of claim 1, wherein the heat sink includes a non-uniform first connecting portion and second connecting portion.

3. The luminaire of claim 1, wherein an occupancy sensor is operatively connected to the light emitter.

4. The luminaire of claim 1, wherein the heat sink includes a cylindrical wall surround a recessed portion.

5. The luminaire of claim 1, wherein the yoke and driver are substantially open to the ambient environment.

6. The luminaire of claim 1, further comprising a junction box connected to the yoke.

7. A high bay luminaire comprising:
a heat sink;
a light emitter connected to the heat sink;
a reflector connected to the heat sink;
a yoke connected to the heat sink at a first connection point, the yoke having a first arm, a second arm, and a top bar; and
a driver connected to the yoke
wherein the heat sink is connected to the yoke at a first connection point positioned on the first arm and the second arm, and wherein the driver is connected to the yoke at a second connection point spaced along the first arm and the second arm a distance from the first connection point, the driver extending between the first arm and the second arm.

8. The luminaire of claim 7, further comprising a junction box connected to the yoke at a third connection point spaced along the first arm and the second arm a second distance from the first connection point.

9. The luminaire of claim 7, wherein the heat sink has a substantially disc-shaped configuration.

10. The luminaire of claim 7, wherein an occupancy sensor is connected to the reflector.

11. The luminaire of claim 7, wherein the yoke and driver are substantially open to the ambient environment.

12. The luminaire of claim 7, further comprising a mount coupled to the top bar.

13. The luminaire of claim 7, wherein the yoke further includes a door pivotally connected to the first arm and the second arm.

14. The luminaire of claim 13, wherein the yoke further includes a spring clip configured to selectively retain the door.

15. A high bay luminaire comprising:
a heat sink having an outer edge;
a light emitter connected to the heat sink;
a yoke moveably connected to the outer edge and having a first arm and a second arm; and
a driver connected to the yoke so that the driver extends at least partially between the first arm and the second arm, the driver being independently removable from the yoke relative to the heat sink.

16. The luminaire of claim 15, wherein the heat sink includes a non-uniform first connecting portion and second connecting portion.

17. The luminaire of claim 15, wherein the heat sink has a substantially disc-shaped configuration.

18. The luminaire of claim 15, further comprising a junction box connected to the yoke, the junction box being moveable with the yoke relative to the heat sink.

19. The luminaire of claim 15, wherein the heat sink includes a cylindrical wall surround a recessed portion.

20. The luminaire of claim 15, further comprising a mount coupled to the top bar.

* * * * *